3,049,473
UDDER-DISPERSIBLE ANTIBIOTIC MASTITIS
CREAMS
Eric Peter Beatson and Joseph Collin Floyd, Manchester, England, assignors to Imperial Chemical Industries Limited, Millbank, London, England, a corporation of Great Britain
No Drawing. Filed May 2, 1957, Ser. No. 656,509
Claims priority, application Great Britain Aug. 13, 1956
1 Claim. (Cl. 167—53.2)

This invention relates to new compositions of matter and more particularly it relates to new veterinary compositions which are suitable for intramammary injection.

According to the invention we provide new veterinary compositions comprising a suspension of penicillin and/or streptomycin in admixture with a suitable dispersing agent as hereinafter defined and a suitable mineral or vegetable oil as hereinafter defined.

The penicillin may be a natural penicillin for example penicillin G or it may be a synthetic penicillin for example penicillin V and it may be in the form of a salt for example the sodium, potassium, calcium or procaine salt. The streptomycin may be present as streptomycin or as dihydrostreptomycin and may be in the form of a salt for example the sulphate or the hydrochloride or in the form of a complex for example the complex formed from streptomycin and calcium chloride.

It is to be understood that the expression "a suitable mineral oil" as used herein means mixtures of hydrocarbon oils known in medicine as liquid paraffin and light liquid paraffin or petroleum preferably those of the British or United States pharmacopoeias. Such mixtures of hydrocarbon oils may be thickened by the addition of aluminum palmitate or by the addition of white or yellow soft paraffins and/or certain compositions which simulate petroleum jellies and consist essentially of hydrocarbons. The expression white or yellow soft paraffins means the bleached or unbleached mixtures of semi-solid hydrocarbons as specified in the British or United States pharmacopoeias.

The expression "a suitable vegetable oil" as used herein is intended to include those readily available vegetable oils for example arachis oil, persic oil, corn oil, cotton seed oil, sesame oil, soya bean oil, raw linseed oil, palm oil, teaseed oil, olive oil and the like and mixtures thereof.

The expression "a suitable dispersing agent" as used herein means those dispersing agents or mixtures of dispersing agents known to the art to have a hydrophilic-lipophilic balance within the range of between about 8 and about 12 and preferably within the range of between 9.5 and about 10.5. Such suitable dispersing agents may advantageously be those products known and available commercially as "Spans" and "Tweens." These products are understood to be essentially partial esters of the common fatty acids for example lauric, palmitic, stearic and oleic acid and hexitol anhydrides for example hexitans and hexides derived from sorbitol and the corresponding condensation products of the said partial esters with ethylene oxide. As particularly suitable dispersing agents there may be mentioned for example polyoxyethylene sorbitan monostearate, polyoxyethylene sorbitan tristearate, polyoxyethylene sorbitan mono-oleate, polyoxyethylene sorbitan pentalaurate, polyoxyethylene sorbitan hexaoleate, polyoxyethylene lauryl alcohol, polyoxyethylene cetyl alcohol and polyoxyethylene sorbitol laurate. Other suitable dispersing agents may be for example mixtures of such products described above in such proportion as to provide a dispersing agent having the required hydrophilic-lipophilic balance within the range of between about 8 and about 12 and preferably between 9.5 and 10.5. Such mixtures may be for example 35% polyoxyethylene sorbitan monopalmitate and 65% sorbitan palmitate, 45% sorbitan monostearate and 55% polyoxyethylene sorbitan monostearate or 80% sorbitan monolaurate and 20% polyoxyethylene sorbitan monolaurate. As a preferred dispersing agent we choose polyoxyethylene sorbitan monostearate.

It is to be understood that the ease of dispersibility of the said veterinary compositions increases in relation to increasing amount of dispersing agent present for example between about 0.5% by weight and about 10% by weight of dispersing agent but it is preferred to use a concentration of between 2% by weight and 3% by weight of dispersing agent in the said compositions. The use of such concentrations of dispersing agent produces no irritant effects on the udder from the presence of the dispersing agent in the said compositions.

As a preferred base formed from the dispersing agent and the suitable mineral or vegetable oil in which the active ingredient or ingredients are subsequently dispersed there may be mentioned the mixture formed from 58.5% by weight of liquid paraffin, 38.5% by weight of white or yellow soft paraffin and 3% by weight of polyoxyethylene sorbitan monostearate. As particularly valuable compositions there may be mentioned those compositions formed from the preferred base as described above and either containing procaine penicillin alone such that there is present 80,780 units of penicillin per gramme of the composition or containing procaine penicillin and dihydrostreptomycin sulphate such that there is present 80,780 units of penicillin and 80,780 units of dihydrostreptomycin per gramme of the composition.

As stated above, the veterinary compositions of this invention are suitable for intramammary injection. They are readily dispersible in water or milk and as such, they are valuable in the treatment of mastitis and associated diseases of the udder.

These compositions are rapidly dispersed within the udder and are subsequently rapidly excreted so that they are superior to those of the compositions already known to the art which are satisfactory in other respects, as has been shown by the determination of the concentration of penicillin in the milk of udders which have been treated with known non-dispersible compositions or with the dispersible compositions of the present invention. It has been found that the presence of a dispersing agent in the compositions of the present invention produces a rapid release of the active ingredient within the udder with consequent higher concentrations of penicillin in the milk over a shorter period of time than is the case when a known non-dispersible composition is used. It has also been found that when the compositions of the present invention are injected into udders there is an immediate high concentration of the active ingredient which is then rapidly eliminated during a period of 36–48 hours after injection. This property is particularly important since there are no significant penicillin residues in the milk after this stated period and thus the milk obtained from such treated udders can be used in the normal manner with minimal risk of causing antibiotic allergy in man or of interfering with bacillary fermentation processes in the production of milk products for example of cheese. Further, repeated field trials using the compositions of the present invention have shown that the compositions are acceptable to the veterinary profession in that histopathological examination of treated udders has shown that no significant tissue irritation occurs as a result of the presence of the said compositions within the udder.

The invention is illustrated but not limited by the following examples in which the parts are by weight:

*Example 1*

93 parts of a mixture consisting of 58.5% of liquid paraffin, 38.5% of white soft paraffin and 3% of polyoxyethylene sorbitan monostearate are sterilised by heating and are then cooled. 7 parts (7,000,000 units) of finely ground procaine penicillin of potency 1000 units per mgm. are then added and the mixture is homogenised to produce a composition containing 70,000 units of penicillin per gramme which is suitable for use in the treatment of mastitis and associated diseases of the udder.

*Example 2*

82.39 parts of a mixture consisting of 58.5% of liquid paraffin, 38.5% of white soft paraffin and 3% of polyoxyethylene sorbitan monostearate are sterilised by heating and are then cooled. 7 parts (7,000,000 units) of finely ground procaine penicillin of potency 1000 units per mgm. and 10.61 parts (7,000,000 units) of finely ground dihydrostreptomycin sulphate of potency 660 units per mgm. are then added and the mixture is homogenised to produce a composition containing 70,000 units of penicillin per gramme and 70,000 units of dihydrostreptomycin per gramme which is suitable for use in the treatment of mastitis and associated diseases of the udder.

*Example 3*

The process of Example 2 is repeated except that the mixture consisting of 58.5% of liquid paraffin, 38.5% of white soft paraffin and 3% of polyoxyethylene sorbitan monostearate is replaced by a mixture consisting of 58.5% of liquid paraffin, 38.5% of white soft paraffin and 3% of polyoxyethylene sorbitan mono-oleate. There is thus obtained a composition containing 70,000 units of penicillin per gramme and 70,000 units of dihydrostreptomycin per gramme which is suitable for use in the treatment of mastitis and associated diseases of the udder.

*Example 4*

The process of Example 2 is repeated except that the mixture consisting of 58.5% of liquid paraffin 38.5% of white soft paraffin and 3% of polyoxyethylene sorbitan monostearate is replaced by a mixture consisting of 58.5% of liquid paraffin, 38.5% of white soft paraffin, 1.05% of polyoxyethylene sorbitan monopalmitate and 1.95% of sorbitan monopalmitate. There is thus obtained a composition containing 70,000 units of penicillin per gramme and 70,000 units of dihydrostreptomycin per gramme which is suitable for use in the treatment of mastitis and associated diseases of the udder.

*Example 5*

The process of Example 2 is repeated except that the mixture consisting of 58.5% of liquid paraffin, 38.5% of white soft paraffin and 3% of polyoxyethylene sorbitan monostearate is replaced by a mixture consisting of 94.5% of arachis oil, 2.5% of aluminum palmitate and 3% of polyoxyethylene sorbitan mono-oleate. There is thus obtained a composition containing 70,000 units of penicillin per gramme and 70,000 units of dihydrostreptomycin per gramme which is suitable for use in the treatment of mastitis and associated diseases of the udder.

*Example 6*

The process of Example 2 is repeated except that the mixture consisting of 58.5% of liquid paraffin, 38.5% of white soft paraffin and 3% of polyoxyethylene sorbitan monostearate is replaced by a mixture consisting of 95% of liquid paraffin, 2% of aluminum palmitate and 3% of polyoxyethylene sorbitan monostearate. There is thus obtained a composition containing 70,000 units of penicillin per gramme and 70,000 units of dihydrostreptomycin per gramme which is suitable for use in the treatment of mastitis and associated diseases of the udder.

*Example 7*

89.39 parts of a mixture consisting of 58.5% of liquid paraffin, 38.5% of white soft paraffin and 3% of polyoxyethylene sorbitan monostearate are sterilised by heating and are then cooled. 10.61 parts (7,000,000 units) of finely ground dihydrostreptomycin sulphate of potency 660 units per mgm. are then added and the mixture is homogenised to produce a composition containing 70,000 units of dihydrostreptomycin per gramme which is suitable for use in the treatment of mastitis and associated diseases of the udder.

*Example 8*

68.39 parts of a mixture consisting of 58.5% of liquid paraffin, 38.5% of white soft paraffin and 3% of polyoxyethylene sorbitan monostearate are sterilised by heating and are then cooled. 21 parts (21,000,000 units) of finely ground procaine penicillin of potency 1000 units per mgm. and 10.61 parts (7,000,000 units) of finely ground dihydrostreptomycin sulphate of potency 660 units per mgm. are then added and the mixture is homogenised to produce a composition containing 210,000 units of penicillin per gramme and 70,000 units of dihydrostreptomycin per gramme which is suitable for use in the treatment of mastitis and associated diseases of the udder.

*Example 9*

91.922 parts of a mixture consisting of 58.5% of liquid paraffin, 38.5% of white soft paraffin and 3% of polyoxyethylene sorbitan monostearate are sterilised by heating and are then cooled. 8.078 parts (8,078,000 units) of finely ground procaine penicillin of potency 1000 units per mgm. are then added and the mixture is homogenised to produce a composition containing 80,780 units of penicillin per gramme which is suitable for use in the treatment of mastitis and associated diseases of the udder.

*Example 10*

79.722 parts of a mixture consisting of 58.5% of liquid paraffin, 38.5% of white soft paraffin and 3.0% of polyoxyethylene sorbitan monostearate are sterilised by heating and are then cooled. 8.078 parts (8,078,000 units) of finely ground procaine penicillin of potency 1000 units per mgm. and 12.200 parts (8,078,000 units) of finely ground dihydrostreptomycin sulphate of potency 662 units per mgm. are then added and the mixture is homogenised to produce a composition containing 80,780 units of penicillin and 80,780 units of dihydrostreptomycin per gramme which is suitable for use in the treatment of mastitis and associated diseases of the udder.

What we claim is:

A process for treating mastitis of the udder which comprises injecting into said udder a cream consisting essentially of an active ingredient selected from the group consisting of penicillin and streptomycin in admixture with a dispersing agent having a hydrophilic-lipophilic balance between 8 and 12 and a liquid paraffin thereby providing an immediate high concentration of said active ingredient in said udder with rapid elimination of said ingredient therefrom during a period of 36–48 hours after injection, the concentration of said dispersing agent being between 0.5% and 10% by weight of said cream.

References Cited in the file of this patent

UNITED STATES PATENTS

| | | |
|---|---|---|
| 2,544,272 | Miller | Mar. 6, 1951 |
| 2,728,704 | Edds | Dec. 27, 1955 |
| 2,792,329 | Woodard | May 14, 1957 |
| 2,914,443 | Lynch | Nov. 24, 1959 |

FOREIGN PATENTS

| | | |
|---|---|---|
| 502,542 | Canada | May 18, 1954 |

OTHER REFERENCES

Zweig: "Procaine Penicillin in the Bovine Udder," Veterinary Record, December 3, 1949, pages 811–813.

Seiden: "Mastitis and Teat Remedies," Manufacturing Chemist, February 1953, pages 63 and 64.

Anderson: "New Surface Active Antibiotics," J. Invest. Dermatology, January 1947, pages 25–33, esp. at page 27.

Husa's Pharmaceutical Dispensing, 5th ed., 1959, Martin, E. W., ed. Mack Pub. Co., Easton, Pa.; chapter 12, "Emulsions," pages 175–204, esp. "Emulsifying Agents—HLB System," pages 182–184.

Foo Song Hom: Thesis, Temple University School of Pharmacy, "The Preparation and Stabilization Studies of Ethiodol Emulsions for Intravenous Hepatolienography," June 1956, 48 pages, Philadelphia, Pa.

American Pharmacy, 4th ed., 1955, ed. by Lymon et al., J. B. Lippincott Co., Philadelphia, Pa., Emulsions, chap. 15, pages 277–302, including Table 18, page 282; "Required HLB Values for Oil-Phase Ingredients," Table 19, page 283; "Synthetic Emulsifying Agents," especially noteworthy pages 294–298, "Emulsifying Agens for Externally Used Products," "Non-ionic Emulsifying Agents," pages 297–298 and pages 298–300, "Deterioration and Preservation of Emulsions."